United States Patent
Roth et al.

[15] 3,653,260
[45] Apr. 4, 1972

[54] FLOW INDICATOR

[72] Inventors: Grant V. W. Roth, 1440 Sheridan Road, Wilmette, Ill. 60090; Charles E. Krupp, Hemmed-In Hollow North Old Rand Road, Wauconda, Ill. 60102

[22] Filed: Dec. 23, 1968

[21] Appl. No.: 786,223

[52] U.S. Cl. ............................................. 73/228, 340/236
[51] Int. Cl. ............................................. G01f 1/00
[58] Field of Search ................... 73/228, 210, 230, 200; 200/61.45 M, 81.9 M, 83 L, 81.9

[56] References Cited

UNITED STATES PATENTS

| | | | |
|---|---|---|---|
| 1,622,715 | 3/1927 | Hawxhurst | 73/200 |
| 1,967,017 | 7/1934 | Bohner | 73/228 X |
| 2,789,174 | 4/1957 | Oliveau et al. | 200/81.9 |
| 2,892,051 | 6/1959 | Moore | 200/81.9 M |
| 3,299,704 | 1/1967 | Wilson | 73/200 |
| 3,347,096 | 10/1967 | Person | 73/200 |
| 319,134 | 6/1885 | Schneider | 73/230 |
| 1,788,976 | 1/1931 | Beraud et al. | 73/228 |
| 2,647,402 | 8/1953 | Ibbott | 73/210 |

FOREIGN PATENTS OR APPLICATIONS

| | | | |
|---|---|---|---|
| 16,814 | 3/1935 | Australia | 200/81.9 |
| 93,553 | 12/1938 | Sweden | 200/81.9 HG |
| 451,068 | 10/1927 | Germany | 73/230 |
| 13,228 | 5/1893 | Great Britain | 73/230 |

*Primary Examiner*—Richard C. Queisser
*Assistant Examiner*—John P. Beauchamp
*Attorney*—Parker, Carter & Markey

[57] ABSTRACT

A flow indicator having an element responsive to liquid flow and a bypass channel for gas flow, the bypass channel being offset from the liquid-responsive member in a direction taken by gases through the device whereby the flow-responsive member is responsive to liquid flow and not to gas or gas-liquid flow. A cooperating external signal transmitting element is mounted for variable positioning on the device.

3 Claims, 3 Drawing Figures

PATENTED APR 4 1972

3,653,260

INVENTORS.
GRANT V.W. ROTH
CHARLES E. KRUPP
BY Parker, Carter & Markey
Attorneys.

FLOW INDICATOR

SUMMARY OF THE INVENTION

A housing having a chamber in an inlet and outlet for the chamber has a liquid-responsive member movably mounted in the chamber. A bypass channel is provided for liquid-generated gases in order to restrict the liquid-responsive member to movement in response to liquid flow and to insulate it from gas flow and from the flow of a gas-fluid mixture. The outlet preferably has an area offset from the inlet in the direction taken by gases within the chamber. The liquid-responsive member carries a magnet for cooperation with an externally-mounted signal transmitting element. The signal transmitting element may be mounted for variable positioning and variable cooperation with the magnet element.

This invention relates to flow indicators and has particular relation to flow indicators usable in systems wherein liquids are subject to production of gases in operation.

One purpose of the invention is to provide a flow indicator capable of rapid reaction in liquid flow.

Another purpose is to provide a flow indicator substantially free of reaction to gas flow.

Another purpose is to provide a flow indicator providing variable indications in response to flow of liquid, liquid-gas mixtures and gas.

Another purpose is to provide a flow indicator having adjustable signal-transmitting elements.

Another purpose is to provide a flow indicator capable of indicating reduction in flow of cooling fluid more quickly than temperature-responsive devices do.

Other purposes may appear from time to time during the course of the specification and claims.

BRIEF DESCRIPTION OF THE DISCLOSURE

The invention is illustrated more or less diagrammatically in the accompanying drawings wherein.

DESCRIPTION OF THE PREFERRED EMBODIMENT

Figure 1:
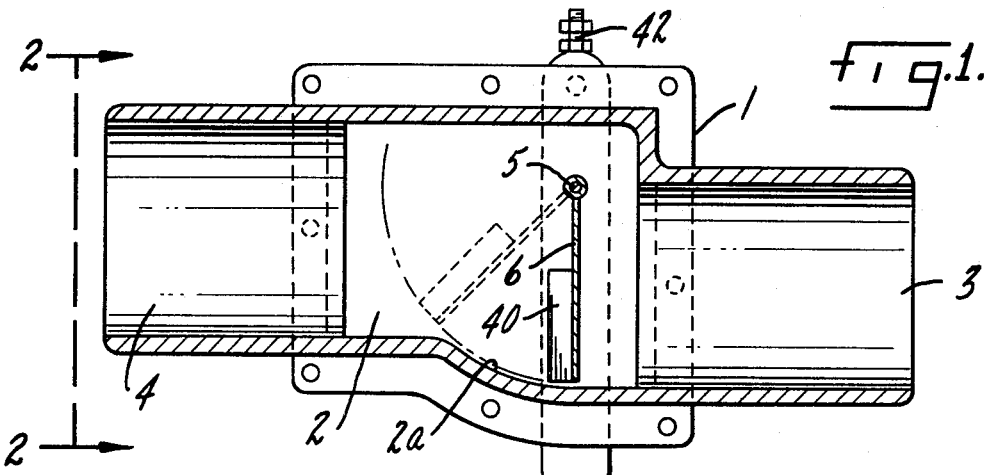
FIG. 1 is a side elevation in cross section illustrating one form of the invention.

Referring now to the drawings, and particularly to FIG. 1, the numeral 1 generally indicates an indicator housing. The indicator housing has a chamber 2 formed therein. An inlet 3 communicates with one end portion of chamber 2. An outlet 4 communicates with another end of the chamber 2.

Mounted for movement within chamber 2, as about the pivot 5, is a flapper member 6.

It will be observed that the flapper member 6 is of a dimension substantially equal to the diameter of inlet 3. Pivot 5 is positioned in substantial alignment with one edge of inlet 3 and inwardly therefrom within chamber 2. A curved wall segment 2a of the wall-defining chamber 2 provides for swinging motion of member 6 about pivot 5 from a position laterally across the axis of inlet 3 to a position substantially axially paralleling the axis of outlet 4, it being understood that flapper member 6 is responsive to the flow of liquid from inlet 3 to outlet 4 through the chamber 2.

It will be observed that the axis of outlet 4 is offset from that of inlet 3 and that outlet 4 consequently has an area positioned above the pivot 5 and above the upper edge of inlet 3 as the parts are shown in the drawings.

The setting of pivot 5 inwardly from the end of chamber 2 communicating with inlet 3 and spacedly from the side of chamber 2 aligned with an edge of outlet 4 thus provides a continuously open channel along the upper edge of inlet 3, the adjacent end of chamber 2 and the upper areas of chamber 2 and outlet 4 as the parts are positioned in FIG. 1.

Figure 2:
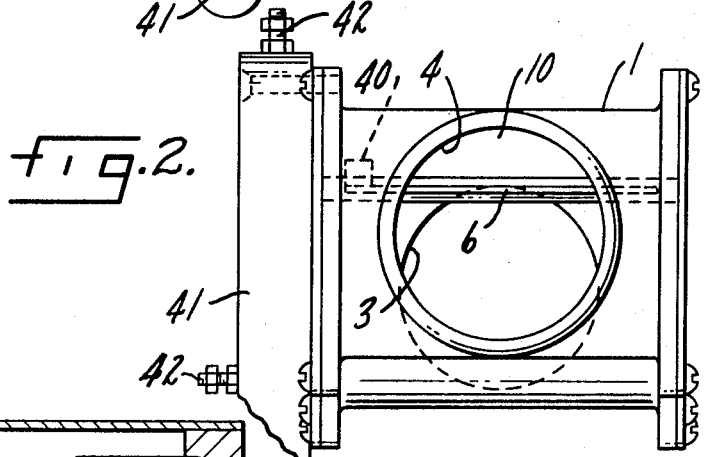
FIG. 2 is a view taken on the line 2—2 of FIG. 1.

As may be best seen in FIG. 2, wherein the member 6 is shown in its uppermost position, the said channel remains open when member 6 is in said position, as indicated at 10.

Figure 3:
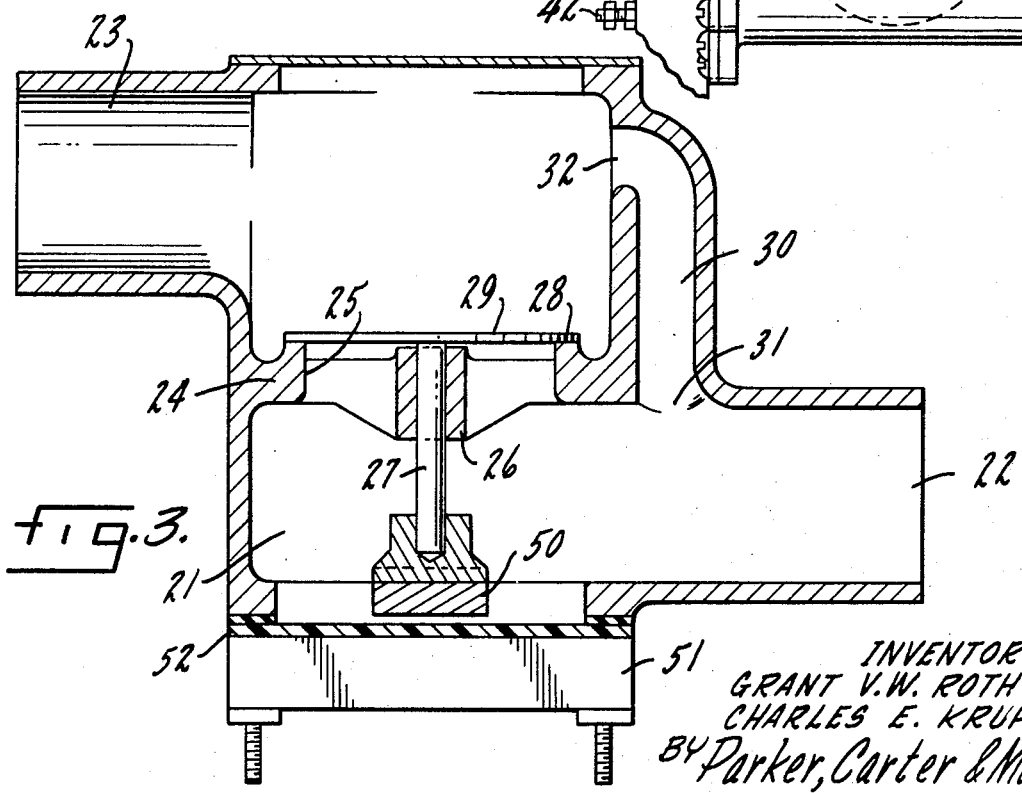
FIG 3 is a side elevation in cross section illustrating a variant form of the invention.

Referring now to FIG. 3, it will be observed that an indicator housing 20 has a central chamber 21 with an inlet 22 communicating with one end portion thereof and an outlet 23 communicating with another end thereof. Intermediate its ends, and thus between the inlet 22 and outlet 23, the chamber 21 is divided by a web 24 having therethrough the passage 25. The web 24 has a central sleeve portion 26 slidably receiving a valve stem 27. A valve seat 28 is formed in web 24 for seating of a valve plate member 29 carried by stem 27. A bypass channel 30 is formed in housing 20 and communicates, as at 31, with the inlet 22 upstream of passage 25 and web 24. The passage 30 communicates, at its opposite end, as at 32, with the chamber 21 and outlet 23 downstream of web 24 and passage 25. As the parts are shown, the passage 30 thus communicates with inlet 22 below valve member 29 and seat 28 and the passage 30 communicates with outlet 23 above valve plate 29 and seat 28, the outlet 23 being positioned in housing 20 above the inlet 22, as the parts are shown.

Referring again to FIG. 1, a magnet member 40 is carried by flapper member 6 for movement therewith in response to liquid flow through chamber 2 from inlet 3 to outlet 4. Pivotally mounted externally of and on housing 1 is a signal-transmitting member 41. A suitable terminal 42 is carried by member 41 for connection with electrical conductors in known manner.

In the device of FIG. 3 a magnet element 50 is carried by valve stem 27 for movement therewith and a magnetic switch member 51 is mounted on housing 20, a nonmagnetic plate 52 closing housing 20 and being thus positioned between magnet 50 and magnetic switch 51 for cooperation therebetween in known manner.

The use and operation of the invention are as follows:

Referring first to the form of the invention illustrated in FIGS. 1 and 2, normal liquid flow from inlet 3 through chamber 2 and outwardly through outlet 4 produces a corresponding movement of flapper member 6 in response thereto. As flapper member 6 moves, the magnet 40 is carried thereby in an arcuate path from its quiescent, vertical position, as the parts are shown, to an appropriate position responsive to the flow through chamber 2. At maximum flow then members 6 and 40 will be at their uppermost position illustrated in FIG. 2.

As the liquid flowing through the device of FIGS. 1 and 2 becomes heated or otherwise tends to gasify, for example when water flowing through said device is heated to the point of steam formation, the said gas or steam will follow the continuously open bypass channel 10 created by the offsetting of pivot 5, and thus of the upper edge of flapper 6 as the parts are shown, and the offsetting of outlet 4 from inlet 3. The resultant diminution in flow of liquid will permit flapper valve 6 to drop from its uppermost position to provide an early indication of the diminution in liquid flow. Should the gasifying process continue to the point at which substantially all of the liquid has been converted to gas or steam, the flapper 6 will further fall to provide further indication of the dangerous situation. Thus a rapid indication of gas formation and resultant unavailability of liquid will be provided. The signal transmitting member 41 is adjustably positioned externally of the housing 1 for signal transmission upon alignment therewith of magnet member 40. Thus a signal may be created at a desired, predetermined condition of liquid-gas flow through the device of FIGS. 1 and 2. In the case of devices, such as diesel engines, subject to rapid destruction upon diminution of cooling liquid below a predetermined volume and temperature, a shutdown mechanism will be connected to terminal 42 of member 41 to provide for immediate shutdown of the sensitive device upon the occurrence of the predetermined gas-liquid mixture flowing through the indicator. It will be understood that an audible signal and similar devices may be connected to terminal 42.

Similarly, with respect to the device of FIG. 3, a normal liquid flow produces a movement of valve 29 off its seat 28 and a consequent separation of magnet 50 from switch 51. As gas or steam forms in the liquid flowing through the device of FIG. 3, the said gas or steam will flow through continuously open bypass passage 30 and the valve 29, as was the flapper 6 of FIG. 1, will be insulated and protected from the affect of said gas or steam flow. The resultant diminution of liquid flow will permit valve 29 to move toward seat 28 and magnet 50 to move toward switch 51. It will be understood that elements 50 and 51 may be arranged for indication at a suitable point in the process of conversion of liquid to gas or steam.

The embodiments of the invention in which an exclusive property or privilege is claimed are defined as follows:

1. A flow indicator including a housing defining a chamber, an inlet for said chamber, an outlet for said chamber, the upper, inner surface of said outlet being substantially coplanar with the upper, inner surface of said chamber, the axial center line of said outlet being above the axial center line of said INLET, A LIQUID flow-responsive member mounted between said inlet and outlet in said chamber for movement in response to flow of liquid therethrough, an unobstructed, continuously open, constant area bypass channel formed in said housing and offset from said flow-responsive member in the direction taken by gases and fluids flowing through said housing from said inlet to said outlet, said outlet being offset from said inlet in said direction, said bypass channel communicating with the uppermost portion of said inlet upstream of said flow-responsive member, extending above said flow-responsive member and communicating with said outlet above the axial center line of said outlet downstream of said flow-responsive member whereby fluids and gases may flow simultaneously through said flow indicator and entrapment of gases therein is precluded.

2. The structure of claim 1 wherein said flow-responsive member comprises a flapper pivoted below and in spaced relation to said upper inner surface of said chamber for movement by fluid flowing from said inlet and simultaneous passage of gases above said member.

3. The structure of claim 1 wherein said flow-responsive member comprises a valve element seated between said inlet and outlet and below the axial center line of said outlet and said channel comprises a hollow passage formed in said housing.

* * * * *